United States Patent [19]

Pierce et al.

[11] Patent Number: 5,405,639
[45] Date of Patent: Apr. 11, 1995

[54] NON-TEMPERING CONFECTIONARY FAT

[75] Inventors: John H. Pierce, Rushden; Paul T. Quinlan, Kempston, both of Great Britain

[73] Assignee: Van den Bergh Foods Co., Division of Conopco, Inc., Lisle, Ill.

[21] Appl. No.: 980,857

[22] Filed: Nov. 24, 1992

[30] Foreign Application Priority Data

Nov. 26, 1991 [EP] European Pat. Off. ......... 91310850.2

[51] Int. Cl.⁶ ................................................ A23D 9/00
[52] U.S. Cl. ................................. 426/607; 426/610; 426/660
[58] Field of Search .................... 426/607, 610, 660

[56] References Cited

U.S. PATENT DOCUMENTS

| 3,492,130 | 1/1970 | Harwood | 426/607 |
|---|---|---|---|
| 4,049,839 | 9/1977 | Luddy et al. | |
| 4,072,766 | 2/1978 | Luddy et al. | |
| 4,130,572 | 12/1978 | Luddy et al. | |
| 4,276,322 | 6/1981 | Padley | 426/607 |
| 4,702,928 | 10/1987 | Wieske et al. | |
| 4,882,192 | 11/1989 | Maeda | 426/607 |
| 5,135,769 | 8/1992 | Itagaki | 426/607 |
| 5,271,950 | 12/1993 | Yamaguchi | 426/607 |
| 5,286,515 | 2/1994 | Yamaguchi | 426/607 |

FOREIGN PATENT DOCUMENTS

| 0354025 | 2/1990 | European Pat. Off. . |
|---|---|---|
| 428200 | 5/1991 | European Pat. Off. . |
| 841316 | 7/1960 | United Kingdom . |
| 841317 | 7/1960 | United Kingdom . |

OTHER PUBLICATIONS

Gunstone 1983 Lipids in Foods Chemistry, Biochemistry and Technology Pergamon Press Ltd. NY/pp. 140–142.

Minifie 1980 Chocolate, Cocoa and Confectionery: Science and Technology, second edition AVI Publishing CT, pp. 208–213.

Swern 1979 Bailey's Industrial Oil & Fat Products vol. 4th ed. John Wiley & Sons NY pp. 374–382.

*Primary Examiner*—Carolyn Paden
*Attorney, Agent, or Firm*—Rimma Mitelman

[57] ABSTRACT

The invention is concerned with blends of cocoa-butter replacement fats A which are high in SSU and fats B which are high in S'OS', wherein:
fats A display a ratio $$\frac{N30 \text{ (stab.)}}{N30 \text{ (unstab.)}} = 1\text{-}3$$

fats A and B are present in amounts providing an SSU content of $\geq 50\%$ and an S'OS' content of $<30\%$ in the blend (S=saturated fatty acid, S'=saturated $C_{16}$–$C_{18}$, U=unsaturated fatty acid; O=oleic acid).

11 Claims, No Drawings

NON-TEMPERING CONFECTIONARY FAT

BACKGROUND OF THE INVENTION

Confectionery fats that are used for the preparation of confectionery products often need to be tempered in order to bring the triglycerides into the desired stable crystal form. This is especially true of fats based on symmetrical mono-unsaturated triglycerides of the SUS type, such as cocoa butter and cocoa-butter substitutes containing shea, illipe or palm oil fractions. However, tempering is a difficult, sophisticated, time- and energy-consuming technique and therefore industry would prefer to avoid tempering, if possible.

For this purpose, much effort has-been spent finding vegetable fat compositions that do not need to be tempered. Solutions were found in the use of lauric-type fats and in fats high in trans-fatty acids. However, the use of these fats entailed other problems as lauric fats hydrolyze easily, leading to an undesirable off-taste, while trans-fatty acids have an unknown dietary significance and can also lead to post-hardening during product storage, causing a poor mouthfeel.

Efforts over many years to derive satisfactory vegetable-based, non-tempering, non-trans, non-post-hardening, non-lauric confectionery fats for stable, bloom-resistant products have so far been unsuccessful.

In BP 841,316 and BP 841,317 the use of lard and tallow animal fat fractions is disclosed as additives to cocoa butter and palm triglycerides for incorporation in chocolate. The lard fractions disclosed are known to contain triglycerides of the SSU type but the disclosed fractions are incorporated with up to 60 wt. % of fats containing high amounts (>75%) of SUS triglycerides for their intended use.

In EP 354,025 a fat composition is disclosed that contains at least 20 wt. % of triglycerides of the SSU type (S=saturated fatty acids; U=unsaturated fatty acids). These fats are reported to prevent bloom formation of confectionery fats, in particular in chocolate. According to the Examples, only limited amounts of SSU are added to the fat composition. Therefore, in all the cases where the SSU fat was added to a fat requiring tempering, tempering still had to be performed. Only when non-tempering fats were used that are high in trans-fatty acids could tempering be omitted.

SUMMARY OF THE INVENTION

We have now found new all-vegetable, non-tempering, non-lauric fat compositions useful for confectionery products in which properties, such as demoulding behaviour, gloss, hardness and melt-down remain surprisingly good.

Our new non-tempering, non-trans, all-vegetable confectionery fat compositions comprise at least a cocoa-butter replacement fat A that is high in SSU and a fat B that is high in S'OS', wherein fat A displays a ratio between the solid fat indices, measured at 30° C., stabilized and unstabilized (NMR pulse) of $$\frac{N30 \text{ (stab.)}}{N30 \text{ (unstab.)}} = 1\text{-}3$$

and wherein fats A and B are present in ratios providing a fat blend with an SSU content of at least 50 wt. % and an S'OS' content of less than 30 wt. %, wherein S=saturated fatty acid having $C_{16}$–$C_{24}$; S'=saturated fatty acid having $C_{16}/C_{18}$, O=oleic acid and U=predominantly oleic and/or linoleic acid.

DETAILED DESCRIPTION OF THE INVENTION $N_{30}$ (stab)-values are conveniently measured after rapidly cooling the fat from 80° C. to 0° C., keeping it at 0° C. for 1.5 hrs; 40 hrs at 25° C.; 1.5 hrs at 0° C.; 1 hr at 20° C.; 1 hr at 25° C. and 1 hr at 30° C.

$N_{30}$ (unstab) were measured after the following regime: cooling from 80° C. to 0° C.; 1.5 hrs at 0° C.; 1 hr at 20° C.; 1 hr at 25° C. and 1 hr at 30° C.

Although according to above the $N_{30}$ ratio applies for fat A, it is very convenient when also the blend of fats A and B meets this same requirement.

Preferred ranges for the S'OS' content are: less than 20 wt. % in particular 5–15 wt. %; and for the SSU content: more than 60 wt. %, in particular 65–75 wt. %.

In this way, compositions are obtained wherein fats A and B are completely compatible. For this purpose, it is preferred that the ratio between the N-values at 30° C. is less than 2.

Fat A is advantageously a fat containing at least 60 wt. %, in particular at least 75 wt. % of SSU. Very convenient is a fat A wherein more than 60 wt. % of PPO (P=palmitic) is present.

Very good results were obtained by applying a fat A with a very sharp N-profile. An N-profile of $N_{20}>80$ and $N_{35}<8.0$ (NMR pulse, not stabilized) is very suitable.

Examples of very suitable fats A are: fractions from an enzymatically made product from the conversion of a fat rich in saturated fatty acids, in particular a palm top fraction high in P3 and a compound providing oleic acid moieties (as disclosed in EP 209,327).

Fat B is a fat that has a high content of S'OS'. Preferred fats have an S'OS' content of at least 70 wt. %. The most preferred fat B is cocoa butter.

For the use of blends of fats A and B in confectionery product, fats A and B are blended in ratios of 95–65 wt. % of fat A and 5–35 wt. % of fat B. In this way, the desired fat compositions can easily be obtained.

Another part of our invention is the use of a fat A that is high in SSU and preferably contains at least 60 wt. % of SSU in chocolate compositions in order to obtain non-temper chocolate that demoulds easily and at the same time displays good gloss, hardness and melt-down properties.

Confectionery products containing the fat compositions disclosed above are also part of our invention.

EXAMPLES I and II

I: A small quantity of chocolate (100 g) was made initially using a typical coating recipe (Table I) with an fat rich in PPO (see Table II) replacing CB. The chocolate was not refined or conched and was used to establish satisfactory cooling tunnel conditions for moulding 50 g-bars of chocolate, commencing at 50° C. This indicated that cooling tunnel temperatures should not be as low as 10° C. or as high as 19° C. for satisfactory demoulding. Avoidance of low cooling tunnel temperatures has throughput and energy benefits.

II: A further quantity of chocolate coating was made (Table III), following standard refining and conching procedures. This chocolate was diluted with standard CB plain chocolate to give coatings ranging in CB content from 4.8% to 28.7%.

Typical $N_{30}$ (stab)/$N_{30}$ (unstab) measurements for such coating fat blends are shown in Table IV.

The molten chocolates were directly block-moulded in a cooling tunnel without tempering and stored at various temperatures. Chocolate hardness was typical of plain chocolate (Table V) and gloss retention was good in products containing less than 15% CB in the fat phase (Table VI).

TABLE I

| Chocolate Coating Recipe (100 g) | |
| --- | --- |
| Cocoa powder (10/12) | 14% |
| Skimmed milk powder | 7% |
| Sugar | 48% |
| Fat | 31% |
| Lecithin | 0.4% |

[CB 4.8% on fat phase]

The ingredients were thoroughly mixed at 50°–60° C. without refining or conching.

TABLE II

| Composition of PPO fat | |
| --- | --- |
| TG | |
| SSS | 6.7 |
| SOS | 2.0 |
| OSS | 77.1 |
| SSLn | 4.5 |
| SOO | 1.1 |
| OSO | 7.8 |
| SOLn | 0.6 |
| FAME | |
| C14:0 | 0.5 |
| C16:0 | 55.6 |
| C18:0 | 7.4 |
| C18:1 | 33.1 |
| C18:2 | 1.9 |

TABLE III

| Chocolate coating recipe (refined and conched) | |
| --- | --- |
| Refining Recipe | |
| Cocoa powder | 16% |
| Skimmed milk powder | 8% |
| Sugar | 54.5% |
| Fat | 21% |
| Lecithin | 0.2% |
| Conching Recipe (6 hours at 50–60° C.) | |
| Refined paste | 88% |
| Fat | 12% |
| Lecithin | 0.2% |

| Chocolate Blends | | |
| --- | --- | --- |
| Coating rich in OPP | Plain chocolate | Chocolate blend Fat phase CB |
| 100% | 0% | 4.8% |
| 95% | 5% | 9.7% |
| 90% | 10% | 14.5% |
| 85% | 15% | 19.0% |
| 75% | 25% | 28.7% |

TABLE IV

| Fat blend | | N30 | | |
| --- | --- | --- | --- | --- |
| Fat A (PPO rich) | Fat B (SOS rich) | N30 (stab) | N30 (unstab) | N30 ratio |
| 100 | 0 | 45.2 | 37.8 | 1.2 |
| 90 | 10 | 28.1 | 25.7 | 1.1 |
| 80 | 20 | 23.0 | 18.4 | 1.25 |
| 70 | 30 | 32.6 | 14.3 | 2.3 |

TABLE V

| Hardness of chocolate coating rich in OPP (2 weeks' storage) | | | | |
| --- | --- | --- | --- | --- |
| % CB on chocolate coating fat phase | Penetration (mm$^{-1}$) | | Hardness (kg cm$^{-2}$) | |
| | 20° C. | 25° C. | 20° C. | 25° C. |
| 4.8% | 10.5 | 18.5 | 68 | 32 |
| 9.7% | 11.0 | 22.0 | 64 | 26 |
| 14.5% | 11.5 | 26.0 | 61 | 21 |
| Typical plain chocolate | 13 | 20 | 52 | 29 |

TABLE VI

| Gloss Retention/Bloom in Chocolate coatings | | |
| --- | --- | --- |
| % Cocoa butter on fat phase | Surface conditions 2 months at 20° C. | Surface condition 1 month × 12 hr cycles 15° C./25° C. |
| 4.8% | Good | Fairly good gloss, bloom-free |
| 9.7% | Good | Fairly good gloss, bloom-free |
| 14.5% | Good | Dull, patchy, growth of large crystals |
| 19.0% | Fairly good, bloom-free | Dull, patchy, growth of large crystals |
| 28.7% | Fairly good, bloom-free | Completely dull |

EXAMPLE III

In a further experiment two separate chocolate coatings were made (Table VII), following standard refining and conching procedures using:
(i) a fat A rich in OPP and
(ii) a fat B rich in POP These coatings were blended to give coatings ranging in SOS content from 0% to 20% (Table VIII).

The molten chocolates were directly block-moulded in a cooling tunnel without tempering and stored at 20° C. Gloss retention was satisfactory in coatings containing up to 20% SOS triglycerides on the fat phase (Table VIII).

TABLE VII

| Refining Recipe | |
| --- | --- |
| Cocoa powder | 16% |
| Skimmed milk powder | 8% |
| Sugar | 54.5% |
| Fat A or Fat B | 21% |
| Lecithin | 0.2% |
| Conching recipe (5 hours at 50–60° C.) | |
| Refined paste | 8.8% |
| Fat A or Fat B | 12% |
| Lecithin | 0.2% |

| Chocolate blends | | Coating blend fat phase | |
| --- | --- | --- | --- |
| Coating rich in OPP | Coating rich in POP | S'S'U | S'OS' |
| 100 | 0 | 79 | 6 |
| 90 | 10 | 72 | 13 |
| 80 | 20 | 65 | 20 |
| 70 | 30 | 57 | 27 |

TABLE VIII

| Gloss retention in chocolate coatings at 20° C. | | |
| --- | --- | --- |
| Coating blend fat phase (%) | Chocolate surface | |
| | 1 month | 3 months |
| 79 S'S'O/6 S'OS' | good | fair |
| 72 S'S'O/13 S'OS' | good | good |
| 65 S'S'0/20 S'OS' | good | fair |

TABLE VIII-continued
Gloss retention in chocolate coatings at 20° C.

| Coating blend fat phase (%) | Chocolate surface 1 month | 3 months |
|---|---|---|
| 57 S'S'O/27 S'OS' | dull | — |

S' = saturated fatty acids having $C_{16}$ and $C_{18}$ in a ratio of about 8.

We claim:

1. Non-tempering, non-trans, all-vegetable confectionery fat composition comprising at least a cocoa butter replacement fat A which is high in SSU and a fat B which is high in S'OS' wherein fat A displays the following ratio of solid fat indices, stabilized and unstabilized (NMR pulse), at 30° C.:

$$\frac{N30 \text{ (stab.)}}{N30 \text{ (unstab.)}} = 1-3$$

and wherein fats A and B are present in ratios providing a fat blend with an SSU content of at least 50 wt. % and an S'OS' content of less than 30 wt. % wherein S=saturated fatty acid having $C_{16}$-$C_{24}$; S'=saturated fatty acid having $C_{16}$-$C_{18}$, O=oleic acid, U=predominantly oleic and/or linoleic acid.

2. Fat composition according to claim 1, wherein the S'OS' content is less than 20 wt. %, in particular 5-15 wt. %, while the SSU content is more than 60 wt. %, in particular 65-75 wt. %.

3. Fat composition according to claim 1, wherein fat A is a hard fat containing at least 60 wt. %, preferably at least 75 wt. %, of SSU.

4. Fat composition according to claim 3, wherein fat A is a fat wherein more than 60 wt. % of PPO (P=palmitic) is present.

5. Fat composition according to claim 1, wherein fat A displays an N-profile (NMR pulse, not stabilized) of $N_{20} > 80$ and $N_{35} < 8.0$.

6. Fat composition according to claim 1, wherein fat A is a fraction from an enzymatically made product from the conversion of a fat rich in saturated fatty acid, in particular palm oil top fraction which is high in $P_3$ and a compound providing oleic acid moieties.

7. Fat composition according to claim 1, wherein fat B contains at least 70 wt. % of S'OS'.

8. Fat composition according to claim 7, wherein fat B is cocoa butter.

9. Fat composition according to claim 1, wherein fat A and fat B are present in ratios of 95-65% A: 5-35% B.

10. Confectionery products containing at least the fat compositions according to claim 1.

11. A process for the production of non-temper chocolate compositions that demould easily and simultaneously display good gloss, good hardness and good meltdown properties, the process comprising incorporating in the chocolate composition a fat blend comprising at least 60 wt. % of SSU triglycerides and less than 30 wt. % $S^1OS^1$ triglycerides wherein S=saturated fatty acid having $C_{16}$-$C_{24}$; $S^1$=saturated fatty acid having $C_{16}$-$C_{18}$, O=oleic acid, U=predominantly oleic and/or linoleic acid.

* * * * *